Nov. 21, 1950  L. T. SAWYER  2,531,299
APPARATUS FOR MAKING HAIR RETAINERS
Filed Dec. 6, 1948  8 Sheets-Sheet 1

Inventor
Lester T. Sawyer
by Roberts, Cushman & Groves
att'ys.

Fig. 5

Nov. 21, 1950 L. T. SAWYER 2,531,299
APPARATUS FOR MAKING HAIR RETAINERS
Filed Dec. 6, 1948 8 Sheets-Sheet 5

Inventor
Lester T. Sawyer
by Roberts, Cushman & Grover
attys.

Nov. 21, 1950 L. T. SAWYER 2,531,299
APPARATUS FOR MAKING HAIR RETAINERS
Filed Dec. 6, 1948 8 Sheets-Sheet 6

Inventor
Lester T. Sawyer
by Roberts, Cushman & Grove
att'ys.

Inventor
Lester T. Sawyer
by Roberts, Cushman & Grover
att'ys.

Patented Nov. 21, 1950

2,531,299

UNITED STATES PATENT OFFICE 2,531,299

APPARATUS FOR MAKING HAIR RETAINERS

Lester T. Sawyer, Leominster, Mass.

Application December 6, 1948, Serial No. 63,798

28 Claims. (Cl. 18—19)

This invention relates to comb-making machines and more especially to a machine for converting an annular blank of plasticizable material, such as is shown in my Patent No. 2,450,448 granted October 5, 1948, into a plurality of combs, each of which is substantially concavo-convex in contour.

As illustrated in the aforesaid application, there is described a method of making combs and hairpins, termed hereinafter hair retainers, of cellulose acetate or similar thermoplastic materials by injection molding. According to the method described therein, a plurality of such hair retainers is produced in the form of a substantially flat annular blank wherein the backs collectively define the inner periphery of the annular blank and the teeth extend divergently outward from the backs in out-of-contact relation with each other, their outer ends being circumferentially spaced and collectively defining the outer periphery of the annular blank. The annular blank thus formed consists of a plurality of interconnected hair retainers, the individual teeth being of approximately the desired shape but in out-of-contact relation with each other. This annular blank is then temporarily plasticized, either by being subjected to a mild degree of heat or to an environment containing a suitable softener or solvent or both, and while the annular blank is in relatively plastic condition it is then applied about a generally cylindrical forming block or die so as to convert it from a substantially flat annular member to a generally cylindrical crown-like member, such conversion being effective to close the out-of-contact teeth to the desired proximity. Where some of the individual teeth are bent or otherwise shaped to provide offset portions, the closing-in operation is effective to bring such offset portions into contiguous or gripping relation with the sides of the adjacent teeth, thereby providing hair-engaging elements adapted yieldingly to grip and hold strands of hair.

The principal objects of this invention are to provide a semi-automatic machine wherein annular blanks of the foregoing kind may be placed, plasticized, molded to crown-like shape, cut into sections and discharged in the form of substantially concavo-convex hair retainers rapidly, efficiently and with a minimum of skill required on the part of the operator.

Accordingly, relatively movable male and female dies are arranged to receive between them an annular plasticized blank of the foregoing kind, the blank being brought to a plastic state in an oven from which it is automatically ejected at the end of a predetermined time upon an inclined tray arranged to receive and gravitationally convey it to the dies. The oven has a discharge opening therein normally covered by a closure which is automatically opened by tilting movement of a discharge plate within the oven upon which the blank rests, tilting movement of the plate being effected at the end of said predetermined time by timing mechanism provided for this purpose. The lower end of the tray is normally situated between the dies, and near its lower end there is a switch operable by passage of a blank thereover and/or thereunder to effect retraction of the tray sufficiently to withdraw its lower end from between the dies prior to relative movement of the dies into engagement. To preclude the possibility of the dies closing on the lower end of the tray before it is withdrawn, the means for effecting relative movement of the dies is initiated by retraction of the tray. Engagement of the dies converts the blank into a generally cylindrical crown-like member having a circular back from which project the teeth. A series of cutters are spaced around the female die and are arranged to be actuated following movement of the dies into engagement to sever the circular back of the crown into sections. Simultaneously air is injected into the female die in the vicinity of the circular back to reduce the temperature of the back sufficiently to set the plastic. Following cutting and cooling of the shaped blank, the dies separate and a pair of diametrically arranged pins, situated in the wall of the female die, is forced inwardly to disrupt the severed crown by forcibly separating two of the sections from the remaining sections so that they tend to collapse inwardly toward the center of the die. To promote collapse, additional air blasts are injected into the die cavity near the upper part thereof to strike the outer surfaces of the severed sections near their tops and hence to topple them inwardly, whereupon they fall by gravity through a central opening in the bottom of the female die provided for this purpose. To assure cutting the back at places between teeth rather than through a tooth, gauge means is placed in the die cavity to receive and orient the blank to correlate the intertooth spaces with the cutters.

The foregoing operations are arranged to take place in a predetermined order by means of a series of electrical and pneumatic switches and valves having appropriate interlocks to prevent premature operation of any of the operating parts which might cause damage if they took place out of order.

The invention will now be described in greater detail with reference to the accompanying drawings in which.

Figures 1, 1C:
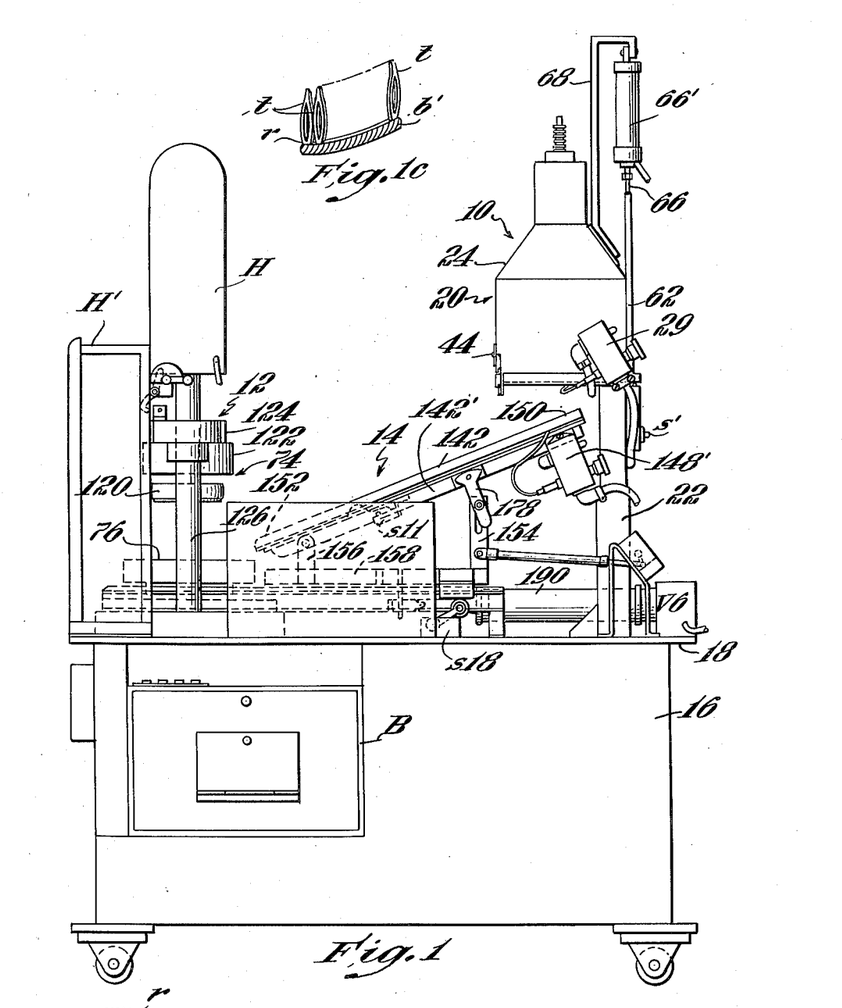
Fig. 1 is a vertical elevation of the machine as seen from the left side.
Fig. 1c is an isometric view of a single comb section.

Referring to Fig. 1, the machine is shown as comprised essentially of a plasticizing unit 10, molding dies 12 for shaping the plasticized blank and transfer means 14 for transferring the plasticized blank from the plasticizing unit to the molding dies. The aforesaid parts are assembled together in operative relation, together with suitable electrical, pneumatic and mechanical mechanisms, for effecting conversion of the blank into hair retainers, upon a support in the form of a table 16 having a flat top 18.

Figure 6:
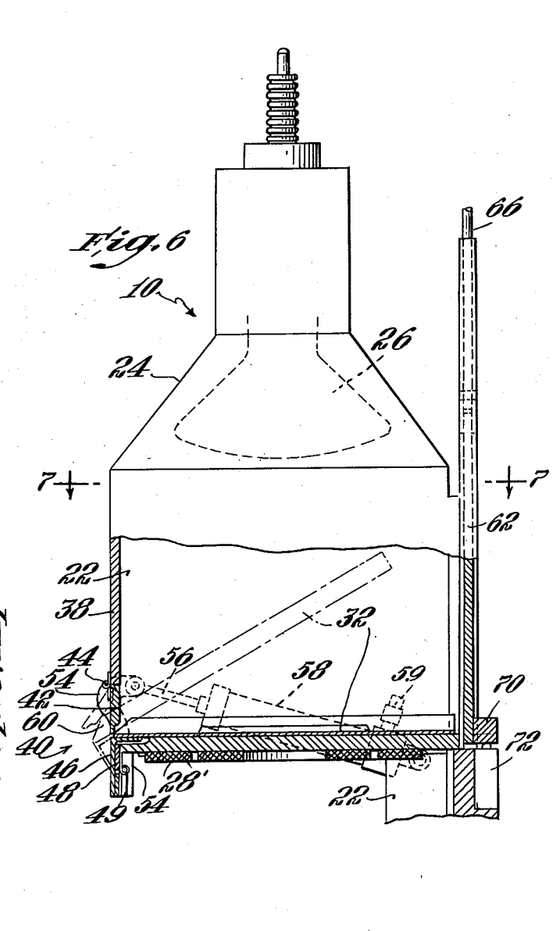
Fig. 6 is a vertical section of the oven, as seen from the left-hand side, enlarged to illustrate the details thereof.
Figure 7:
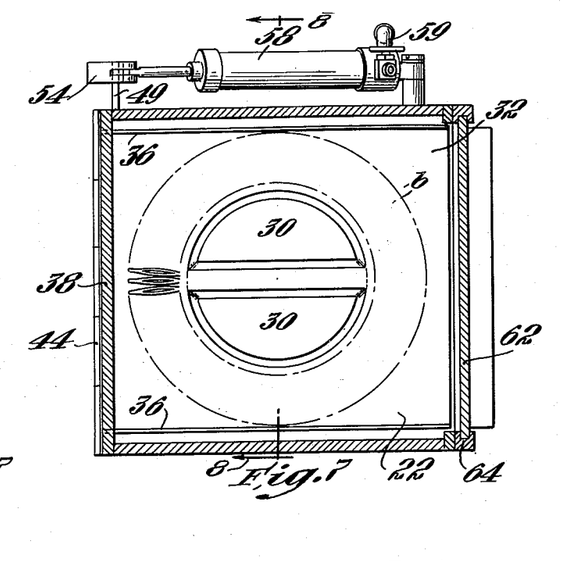
Fig. 7 is a horizontal section on the line 7—7 of Fig. 6 showing the blank support.
Figure 8:
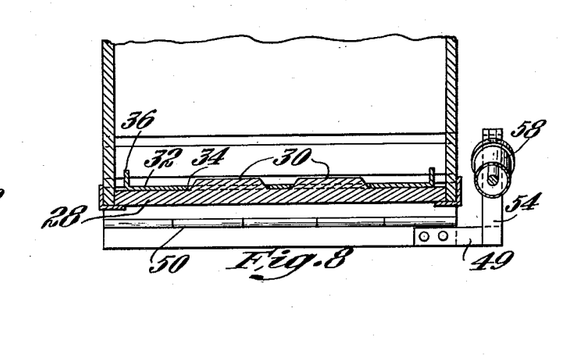
Fig. 8 is a fragmentary vertical section, on the line 8—8 of Fig. 7, showing the discharge plate.
Figure 9:
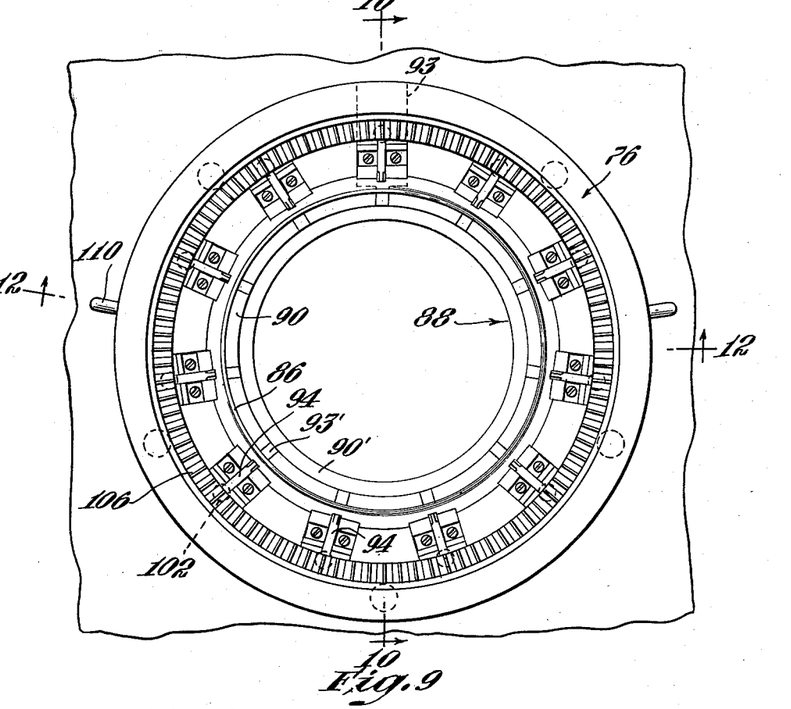
Fig. 9 is a plan view of the female die.

The plasticizing unit 10 is in the form of an oven 20 situated above the table top 18 on top of a post 22 fastened to the table top and rising vertically therefrom. The oven, as seen by reference to Figs. 6 to 8, is a substantially rectangular chamber 22 bounded by four walls and surmounted by a truncated top 24 within which there is situated a heating element 26 in the form of a lamp which gives out predominantly infrared rays for plasticizing a blank placed in the oven. The oven has a substantially horizontally imperforate bottom 28, to the under side of which there are secured heating coils 28' which are supplied with current from a suitable source by way of controls 29. The upper surface of the bottom has rising therefrom a pair of spaced, semi-circular islands 30, the outside diameter of the combined islands being slightly less than the inside diameter of the blank b (Fig. 1a) which is to be plasticized so that when the blank is dropped into the oven it will automatically center itself within the oven. The upper peripheral edges of the semicircular islands are beveled so that the blank will not be caught on an edge and held tilted. There is also in the oven a discharge plate 32 which has in it a pair of semicircular openings 34 arranged to fit over the semicircular islands 30 so that it rests flat on the bottom and forms a support for the blank. The discharge plate is tilted to effect discharge of a plasticized blank, and has flanges 36 along its opposite sides to prevent the blank from sliding off at one side or the other, while at least one end is left open to permit the blank to slide off at that end when the plate is raised, as will subsequently appear. The forward wall 38 of the oven has near the lower part thereof a transverse discharge opening 40 which is normally covered by a closure 42 attached by hinges 44 to swing outwardly from its upper edge when a blank is to be discharged. The lower edge of the closure 42 terminates just short of the bottom 28, leaving a narrow opening along the bottom of the oven below the lower edge of the closure. A right-angle strip 46 is fastened to the under side of the plate 32 near the narrow opening so that its vertical flange projects out through the narrow opening and downwardly substantially in the plane of the closure. A narrow plate 48 is fastened to the bottom 28 to project downwardly therefrom behind the vertical flange of the strip 46 and to the rear side of this plate there is fastened the upper leaf of a hinge 50. The lower leaf of the hinge 50 is fastened by way of a filler strip to the vertical flange of the angle 46. Near one end of the lower leaf of the hinge (Fig. 8) there is fastened a short plate 49 which projects laterally therefrom and is fastened at its outer end to the lower end of an arm 54, the opposite end of which is pivotally connected to a piston rod 56 which forms part of a piston and cylinder assembly 58. The piston and cylinder assembly may be supplied from a storage tank 200 (Fig. 13) with a motivating fluid such as compressed air through a suitable duct 59 in which there is interposed a control valve V5 to cause the piston rod to move in one direction therein, and as it is moved, the angle bar 46 is tipped on the hinge 52 which, in turn, tips the plate 32 attached thereto to the position shown in dot-and-dash lines in Fig. 6. As the plate 32 tips upwardly and forwardly, the blank resting thereon is lifted off the islands and the forward end 60 of the plate pushes the closure 42 outwardly on its hinge 44, thereby allowing the plasticized blank to slide outwardly through the discharge opening 40. A bleeder orifice is provided in the cylinder to permit escape of the motivating fluid and hence to allow the plate 32 to return to its horizontal position by gravity when valve V5 is closed, the orifice being adjustable to regulate the return movement of the plate and cushion its fall.

The blank b (Fig. 1a) is introduced to the oven through a charging opening in the opposite, that is the rear, wall which is normally covered by a charging door in the form of a vertically sliding plate 62 arranged to slide in vertical ways 64 formed in the opposite walls of the chamber. Upward movement of the slidable plate 62 is effected by a rod 66 which is connected to a piston and cylinder assembly 66' (Fig. 1), the latter being supported by a bracket 68 fixed to the top of the oven. The slidable plate 62 is raised by the piston and cylinder assembly 66' and is allowed to fall by gravity. Rising movement is effected by energization of a solenoid L1 controlling a valve V1 interposed in a duct 66a leading to the lower end of the cylinder; and falling movement is accorded by deenergization of the solenoid so that the operating fluid escapes through an adjustable bleeder orifice incorporated in the valve.

The valve V1 is opened to raise the charging door 62 by the energization of the operating solenoid L1 (Fig. 13) from the terminals $a$ and $c$ of a conventional power source (not shown) by means of a circuit including the conductor $w1$, a normally closed switch $s1$, and either one of the parallel connected normally open switches $s2$ or $s2m$. If the circuit is completed by the switch $s2$ whose operation will be described hereinafter, the electrical path to terminal $c$ includes the conductors $w22$, $w18$ and $w9$. A lead $w2$ connects the switch $s2m$ with terminal $c$. Also connected in parallel with the switches $s2$ and $s2m$ is the normally open contact $s3$ of a holding relay whose solenoid L2 is connected in parallel with the valve operating solenoid L1.

As the slidable plate 62 reaches its closed position it depresses and actuates a switch $s4$ situated near the bottom of the oven which sets timing means, such as the timer T1 (Fig. 13) into operation to limit the length of time that the blank will be exposed to the heating element within the oven, and to this end at the end of a predetermined time brings about actuation of the piston and cylinder assembly 58 to tilt the plate 32 and open the closure 42 and hence to discharge the plasticized blank. The proper timing to assure the right degree of plasticity following charging will be determined to some extent by the kind and thickness of the material of the blank. The charging door 62 is initially opened manually by the closing of the switch $s2m$ near the front of the machine, thereby to complete the above described circuit for energizing the valve operating solenoid L1. The relay solenoid L2 is concomitantly energized to close the contacts $s3$, thus completing a holding circuit which maintains the solenoid L1 energized after the switch $s2m$ is released to return to its normally open position. After the blank has been dropped into place, the charging door 62 is closed by the manually operable trip switch $s4$ which interrupts the circuit energizing the valve solenoid L1 so that the valve V1 bleeds the fluid trapped in the cylinder assembly 66', as described heretofore. After the machine is once started, however, opening of the charging door 62 will be effected automatically independently of the manual opening switch by the tripping of the switch $s2$ by the return of a carriage 158 which forms part of the transfer means as will appear hereinafter.

Figure 13:
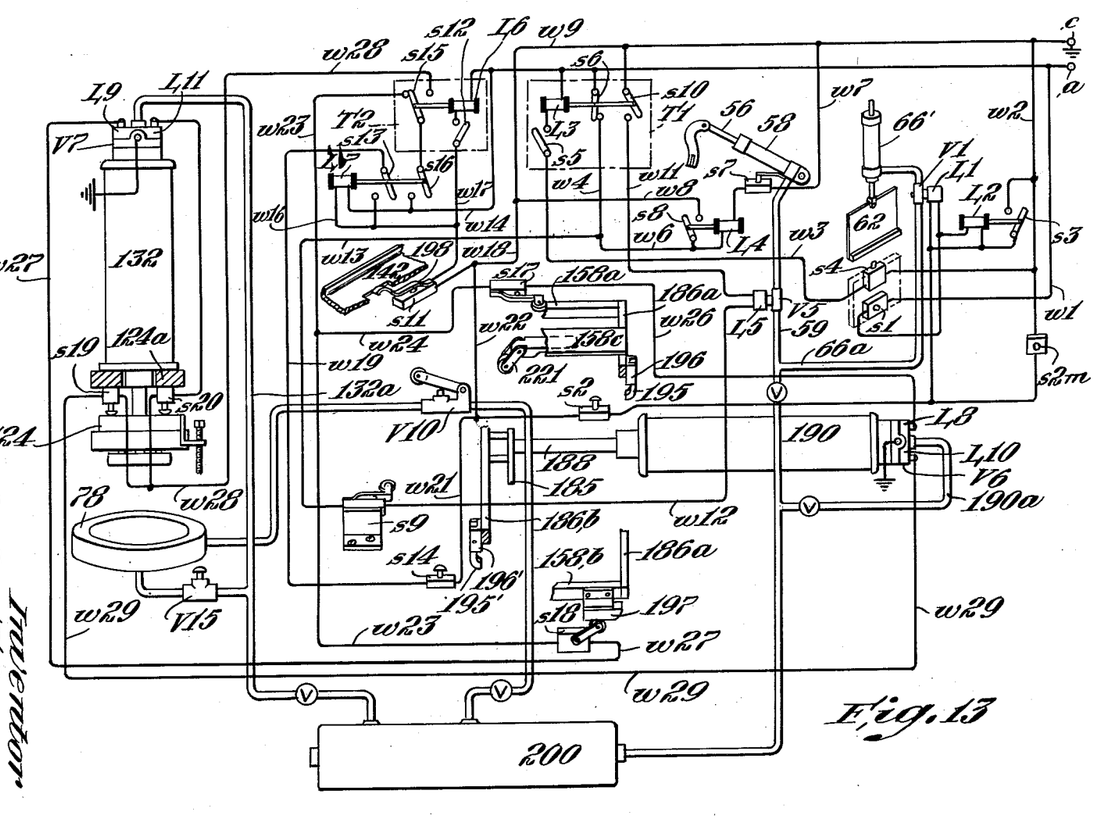
Fig. 13 is a schematic view of the pneumatic and electrical systems.

As mentioned above, the closing of the charging door 62 closes the switch $s4$ to connect the timer T1 to the power source terminals $a$ and $c$ by a circuit including the conductor $w2$, the switch $s4$ and and a conductor $w3$. The timer T1 may be any of the well-known conventional types wherein the contacts $s6$ and $s10$ are transferred by the energization of a solenoid L3 upon the lapse of a predetermined time (for example, 6 seconds) after the initial energization of the timer by the above described circuit. This is schematically illustrated in Fig. 13 by a time delayed closing switch $s5$ which may consist either of mechanical contacts operated by a clock mechanism or of a vacuum tube having an associated timing circuit whereby the potentials impressed upon the tube electrodes are changed after a time delay so that the tube conducts. In either case, the completion of a circuit through $s5$ energizes the solenoid L3 to transfer the contacts $s6$ and $s10$ after the lapse of the predetermined time interval.

Prior to the opening of the normally closed contact $s6$ by the operation of the timer T1, a circuit is completed including the contact $s6$, the leads $w4$ and $w6$, a relay solenoid L4, a normally closed switch $s7$ and a lead $w7$, thereby to energize the solenoid L4 from the power source terminals $a$ and $c$ closing a normally open contact $s8$. Upon the transfer of the contact $s6$, the solenoid L4 remains energized as its contact $s8$ completes a holding circuit including the leads $w8$ and $w9$ which parallels the contacts $s6$. The concomitant closing of the normally open contact $s10$ energizes a solenoid L5 from the power source terminals $a$ and $c$ through a circuit comprising the contact $s10$, a conductor $w11$, the solenoid L5, a conductor $w12$, a normally open carriage interlock $s9$, a conductor $w13$, the lead $w6$, the contact $s8$, and the leads $w8$ and $w9$. The interlock $s9$ is mounted on the table top 18 so that a roller at the end of its operating arm is in contact with a web 185 when the carriage 158 is in its advanced position.

The energization of the solenoid L5 opens the valve V5 so that the piston and cylinder assembly 58 tilts the plate 32 to discharge the blank $b$, as described in detail heretofore. Near the end of the movement of the piston and cylinder assembly 58 the cylinder trips the normally closed switch $s7$ which is mounted thereunder, thereby to deenergize the relay solenoid L4. The contact $s8$ opens to deenergize the solenoid L5 so that the valve V5 closes, thereby permitting the plate 32 to return to its normal position after the discharge of the blank $b$, as described in detail heretofore.

Figures 1A, 1B:
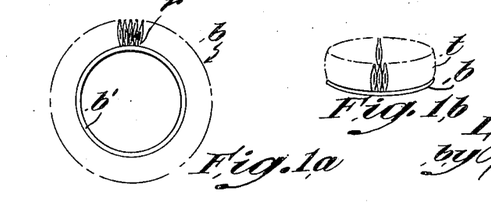
Fig. 1a is a plan view of a premolded annular blank.
Fig. 1b is an isometric view of a blank such as is shown in Fig. 1a after shaping in the form of a generally cylindrical crown-like member having a circular back and projecting teeth.
Figure 4:
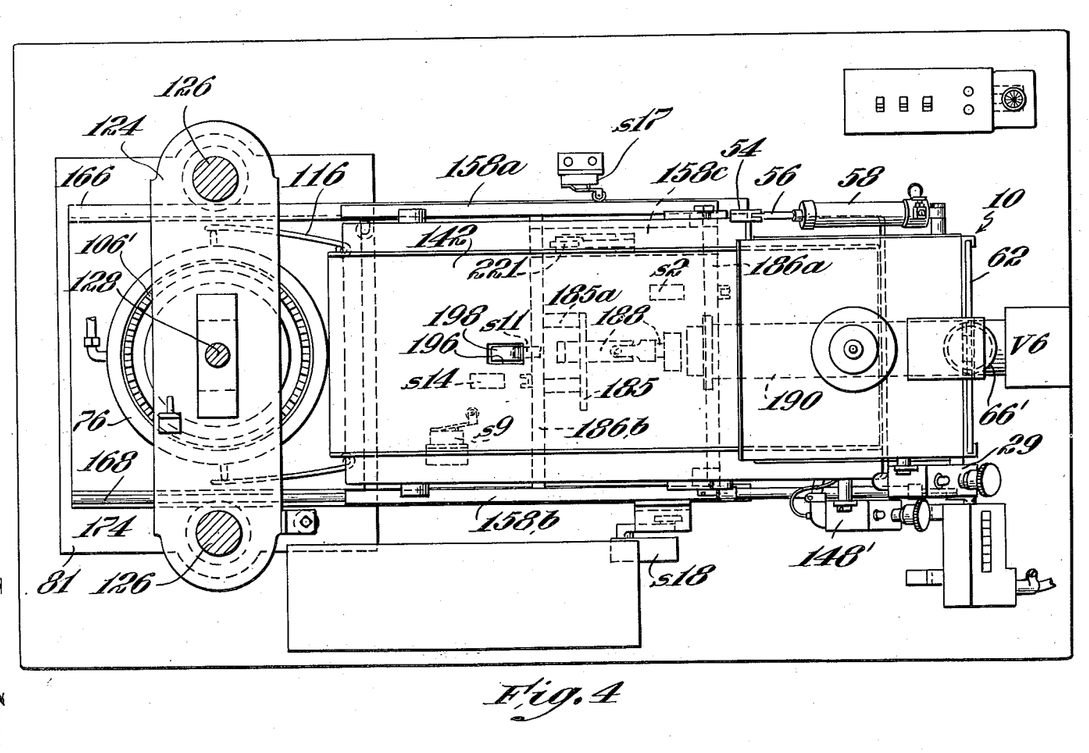
Fig. 4 is a plan view looking down on top of the machine.
Figure 10:
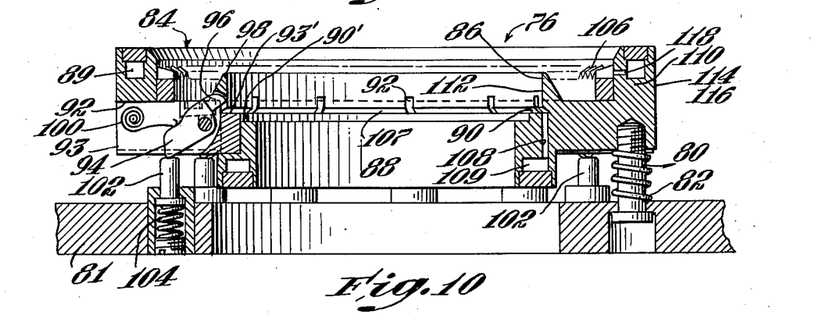
Fig. 10 is a vertical section, on the line 10—10 of Fig. 9.
Figure 11:
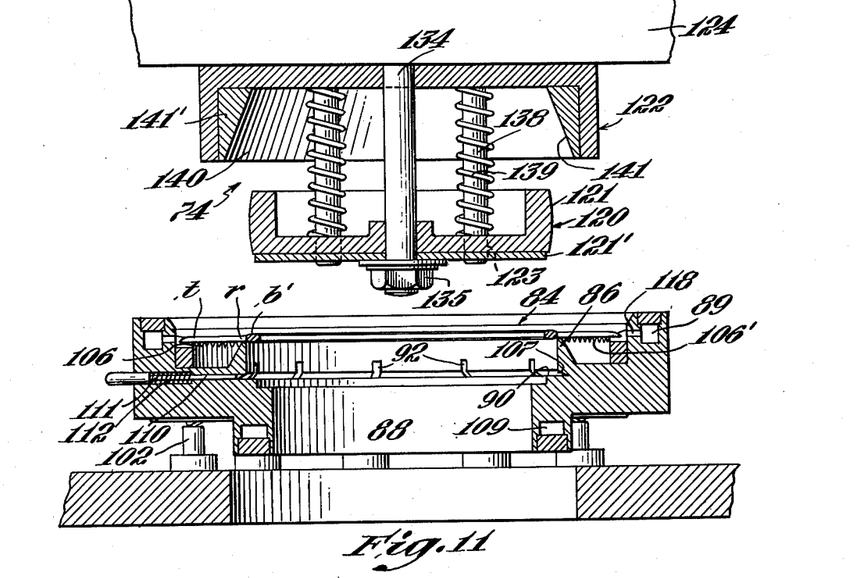
Fig. 11 is a vertical section of the male and female dies separated just prior to molding with a blank resting on the female die.
Figure 12:
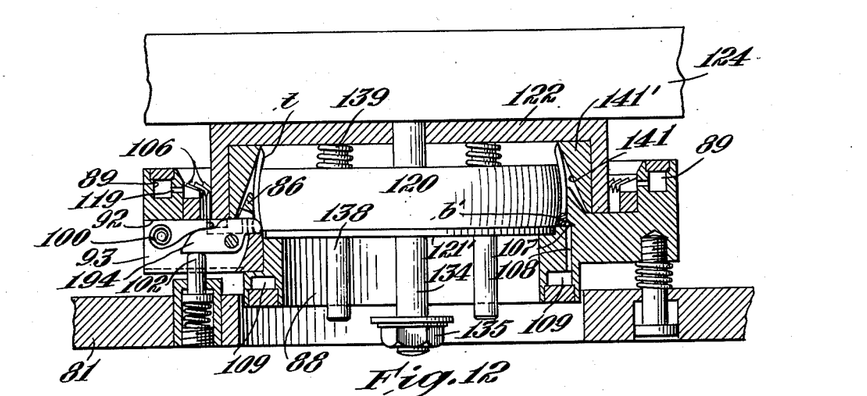
Fig. 12 is a vertical section of the male and female dies closed on a blank and with the cutter moved into cutting position.

The molding dies for shaping the flat blank $b$ to convert it into a generally cylindrical crown-like member, as shown in Fig. 1b, are comprised of relatively movable male and female dies 74 and 76 arranged one above the other (Fig. 11) and movable into and out of molding engagement (Fig. 12). The female die, as more specifically shown in Fig. 10, is in the form of an annulus 76 which is yieldably supported on its under side by stiff coiled springs 80 interposed between it and the top of a rigid bed plate 81 resting on the table top, the springs being retained in place by bolts 82 extending through the plate 81 from its under side and being threaded into the annulus. The annulus has a die cavity 84 of slightly greater diameter than the outside diameter of the annular blank within which there is concentrically arranged an annular work support 86, the upper work-supporting edge of which is slightly greater in diameter than the inside diameter of the annular blank and which has a conical outer wall and a substantially vertical inner wall. Inwardly of the annular work support at the bottom of the vertical wall there is a discharge opening 88. Bordering the discharge opening at the bottom of the vertical wall there is a horizontal shoulder or ledge 90 upon which the back $b$ of the blank is forced when converted into its generally cylindrical shape by the male die, as will be described hereinafter. A second and narrower shoulder 90' lies below and inwardly of the shoulder 90. Spaced about the female die cavity at regular intervals are radial slots 92 which extend through the annular work support to the inside thereof. In these slots are removably latched blocks 93 which have pivotally supported therein cutters 94 each having inwardly directed cutting edges 96 adapted to be projected into that portion of the die cavity within the annular work support in the vicinity of the ledge 90. The ledge 90 is cut away at the point of entrance of the block 93 to receive a hardened tongue integral with the inner end of the blank and which has a top surface in the plane of the ledge thereby to form an anvil 93' for the cutter to act upon. The outer or tail end of each cutter projects downwardly below the annulus and has contact with the upper inclined end of a spring-pressed plunger 102 set into the bed plate 81. As thus arranged, downward movement of the female die when forced from above by the male die after the dies are engaged will press the female die toward the table top in opposition to the springs 80, and this in turn will tilt the cutters 94 so as to project their cutting edges 96 into the die cavity and sever the back of the crown resting on the ledge at a series of points so as to form a plurality of comb sections. The cutters are normally held in a retracted position by coiled springs 100 situated in the slots behind them. As related, the annular work support 86 is of slightly larger diameter than the diameter of the circular back of the blank (Fig. 11) so that when the blank rests on the support the back portion b' lies inside of the support, the root portions r of the teeth overlie the upper edge of the support and the main portions of the teeth t project beyond the support toward the extreme inner wall of the cavity. To orient the blank so that the cutters will cut between teeth and not through teeth, positioning means 106 is provided about the inside wall of the die cavity 84 to receive the teeth and turn the blank in one direction or the other as it lands on the die to bring it to the proper position for cutting. As illustrated, the positioning means is in the form of a series of upright, spaced gauge teeth 106 between which the teeth t of the blank are caught when the blank falls on the support, the peaked gauge teeth 106 shifting the blank in one direction or the other so that its teeth will settle into the spaces between the gauge teeth if they perchance land on the apex portions thereof. The gauge teeth 106 are so arranged with respect to the cutters that each cutter lies halfway between the spaces between a pair of gauge teeth, that is, directly opposite the apex of a tooth. After the molding operation has been completed and substantially simultaneously with the cutting operation, cooling air is injected under pressure into the female die in the vicinity of the back b' of the crown to lower the temperature sufficiently to set the plastic, and to this end a channel 107 is formed peripherally of the inner wall of the work support at the intersection of its vertical wall with the ledge 90 near the bottom of the female die into which open a plurality of substantially equally spaced passages 108. The lower ends of the passages 108 are connected to a common circular manifold 109 formed in the annulus which is supplied with air by way of a suitable valve V10 at the proper time, as will be described hereinafter. Following the cutting and cooling operation, the male die is retracted (Fig. 11), and to eject the severed comb sections two pins 110 are arranged in radial passages 112 substantially diametrically opposed to each other within the die wall just above the ledge 90. Springs 111 normally hold the pins retracted with their inner ends within the channel 107 and with their outer ends projecting from the periphery of the die. A pair of arms 116 (Fig. 4) are arranged to engage the outer ends of the pins and to be actuated by restoration of the tray to its initial forward position, as will appear hereinafter, to force the pins inwardly following retraction of the male die to dislodge the severed comb sections immediately opposite them inwardly, thereby to disrupt the severed crown. As a result, the comb sections tend to fall inwardly toward the center of the die. To promote inward movement of the sections and total collapse of the crown, a plurality of substantially equally spaced orifices 118 are formed in the upper part of the wall of the female die just above the upper edge of the annular work support 86 through which jets of air may be forced to impinge upon the outside surfaces of the comb sections so as to tip them inwardly and to cause them to fall by gravity into and through the opening 88. The orifices are connected to a common circular manifold 89 formed in the wall which in turn is connected to a suitable supply of compressed air by way of an appropriate valve V15 (Fig. 13).

Figure 5:
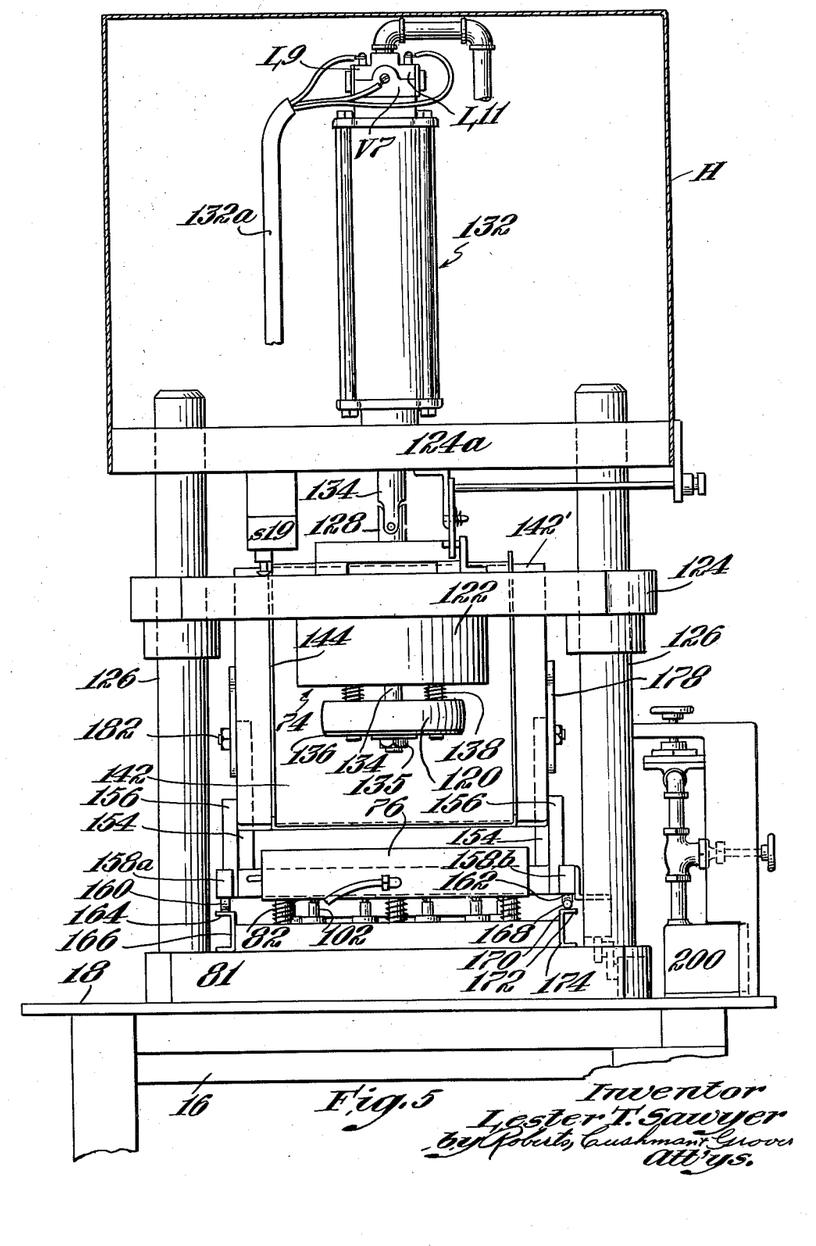
Fig. 5 is a vertical end elevation, as seen from the rear end of the machine.

The male die which is brought into engagement with the blank b, supported on the work support 86 within the female die, is comprised of two parts 120 and 122, as shown in Figs. 5 and 11, which are mounted for vertical movement to and from the female die on a crosshead 124 which is arranged to slide vertically on a pair of spaced posts 126 rising from the bed plate 81 resting on the top of the table. To effect vertical movement of the crosshead 124, the latter is connected by a link 128 to a piston rod 130 which forms part of a piston and cylinder assembly 132, the latter being secured to a tie bar 124a connecting the upper ends of the posts 126. Air under pressure is delivered to the cylinder through a duct 132a having a control valve V7 operated by the solenoids L9 and L11. The cylinder and piston assembly 132 is double acting, the momentary energization of the solenoid L9 moving the control valve V7 so that the crosshead 124 is positively lowered; the energization of solenoid L11 moving the valve positively to raise the crosshead 124. The part 120 is in the form of a short piston-like plunger having a vertically convex, peripheral surface 121 and a subjacent short cylindrical surface 121' of smaller diameter so that a low shoulder extends around the under side of the plunger which will fit closely within the inner wall between the ledges 90 and 91. The plunger is slidably supported for a limited amount of vertical movement relative to the crosshead and to this end is mounted on a rod 134 which passes through the center thereof and is retained thereon by a nut 135 on the lower end of the rod. The rod 134 is fixed to the crosshead at its upper end and extends substantially vertically downward therefrom. The plunger 120 is yieldably held at the lower extremity of the rod 134 and spaced from the part 122 by a pair of springs 138 surrounding rods 139 fixed at their upper ends to the part 120 and extending downwardly therefrom through holes 123' in the part 120. The part 122 is a conforming member, is fastened directly to the crosshead, and has in its lower surface a circular recess 140, the inner peripheral wall 141 of which is conical, having a wide mouth arranged to telescope over the conical outer surface of the support 86 in the female die. As illustrated the diameter of the upper or smaller end of the conical wall is of somewhat smaller diameter than the upper edge of the work support so as to bend the teeth inwardly and hence impart a concavo-convex shape to the comb sections. It is to be understood that the inclination of the slope may be varied in one direction or the other depending upon the degree of convexity desired in the comb sections. To afford a convenient changeover in this respect the conical surface 141 is formed in a ring 141' which may removably be forced into the part 122. When the male die is brought into engagement with the female die (Fig. 12) the part 120 first engages the inner annulus of the blank b, the latter being caught and centered by the entrance of the shallow shouldered portion 121' thereof with the inner annulus and forces it downwardly inside of the annular support 86. The diameter of the plunger 120 is such that there is a clearance between it and the inner peripheral wall of the support 86 substantially equal to the thickness of the blank. Hence, when the plunger 120 moves downwardly, the back b' and teeth t are tipped downwardly into the inner annulus from a horizontal plane into a subvertical plane while the outer ends of the teeth tip upwardly to form a cylindrical member which lies between the convex surface of the plunger and the inner peripheral wall of the support 86 (Fig. 12). Engagement of the cylindrical portion 121' with the shoulder 91 insures accurate centering of the male and female dies. When the plunger 120 comes into engagement with the ledge 90 it stops, the conforming member 122 moves down over the outside of the support 86, and the inclined peripheral inner surface 141 thereof bends the upstanding teeth inwardly against the convex peripheral surface of the plunger 121 so that the cylindrical member will have a substantially concavo-convex shape.

Figures 2, 3:
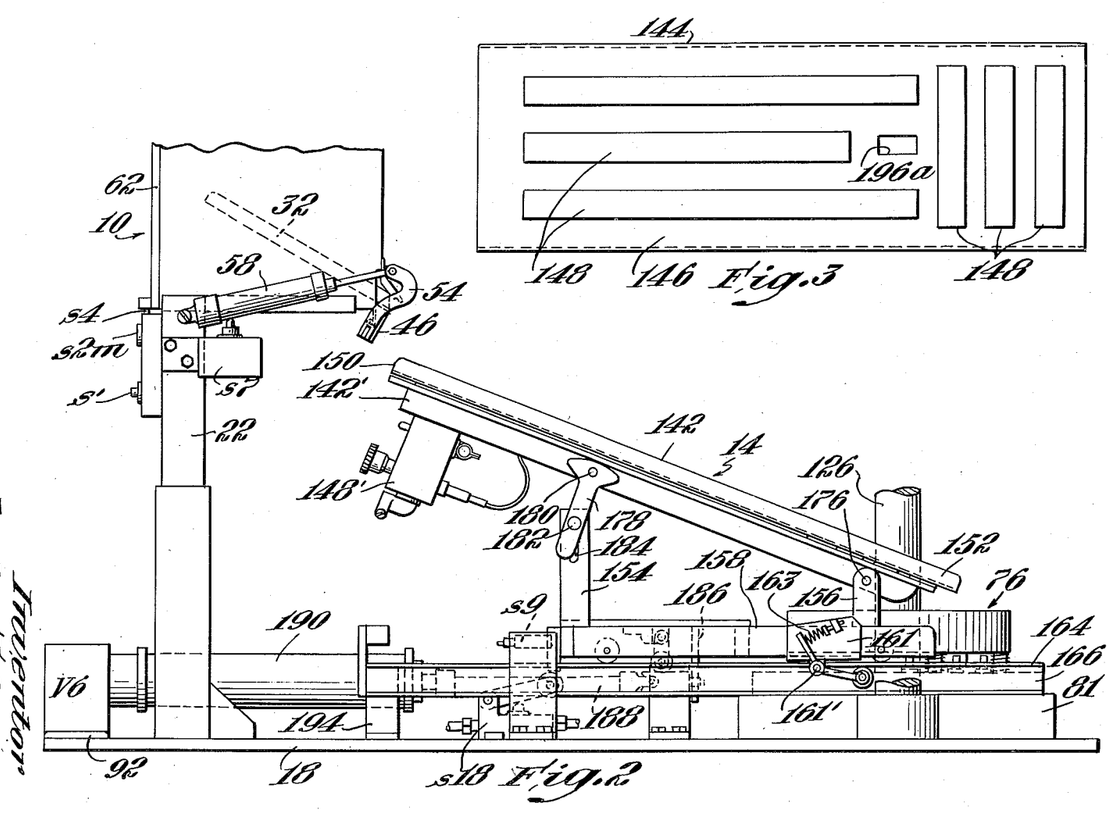
Fig. 2 is a vertical elevation somewhat enlarged, as seen from the right side, with the support omitted, a portion of the oven omitted and the male die omitted.
Fig. 3 is a plan view of the transfer tray as seen from the bottom side.

To effect transfer of a substantially plasticized blank from the oven to the dies for shaping, there is provided the transfer means 14 (Figs. 1, 2 and 4) which is in the form of a movable inclined tray 142 having vertical bordering flanges 144 at its opposite edges. The bottom 146 of the tray has in it a plurality of embedded heating elements 148 so that as the plasticized blank is discharged from the oven thereinto it will be maintained at a substantially constant temperature or at least will not cool off materially before it is deposited onto the female die. Suitable controls 148' are attached to the under side of the tray, as illustrated in Fig. 2, near the top thereof for adjusting the current delivery to the heating elements and hence the temperature of the tray. The tray is arranged so that its upper end 150 is close to the discharge opening of the oven and its lower end 152 is close to the dies. The tray is attached to a platform 142' which is supported in the aforesaid inclined position on spaced rear legs 154 and forward legs 156 rising from a carriage 158, the latter being movable in a horizontal plane forwardly and rearwardly on two pairs of wheels 160 and 162 rotatably supported by the respective side pieces 158a and 158b. The pairs of wheels 160 at one side of the carriage have flat rims (Fig. 5) which rest on a track constituted by the upper limb 164 of a channel 166 set on one edge and extending longitudinally of the table top. The pairs of wheels 162 at the other side have transversely concave rims which rest on a track constituted by a rod 168, the latter being welded to one limb 172 of a channel 174 set on the edge and extending lengthwise of the table. By provision of the concave rimmed wheels 162 lateral displacement of the carriage is prevented. The side pieces 158a and 158b are maintained in spaced relationship by two cross members, one member 186a being located at the front of the carriage 158, the second member 186b being located approximately at the midpoints of the respective side pieces. To hold the carriage down so that its wheels will not become disengaged from the track, plates 161 are attached to the outer sides of the side pieces 158a and 158b and to these plates are pivotally fastened bell levers 161'. One arm of each bell lever carries a roller mounted on an inwardly directed stud so that it is situated between the limbs of the channel 166. A tension spring 163 connected to the other arm of the bell lever and to the plate yieldably urges the bell lever in a direction to hold the roller engaged with the under side of the upper limb.

To permit adjustment of the inclination of the tray, the forward end of the platform is pivotally attached to the upper ends of the forward pair of legs 156 (Fig. 2). The rear end of the platform has fastened to its under side a pair of arms 178, the lower ends of which are fastened by means of bolts to the pair of rear legs 154, the bolts being adjustable in vertical slots 184 formed near the upper end of the legs. To the front side of the cross member 186b there is fastened by means of the struts 185a a transversely extending web 185, and to this web there is connected a piston rod 188 which forms a part of a piston and cylinder assembly 190 for moving the carriage forwardly and rearwardly with respect to the dies and hence enabling retraction of the forward end of the tray from between the dies. The piston and cylinder assembly 190 is supported on the surface of the table by means of brackets 192 and 194, and is supplied with air under pressure by way of a duct 190a in which there is interposed a valve V6 operated by the solenoids L8 and L10, the former being actuated at the proper time to withdraw the tray from between the dies. To this end a cantilever lever 198, operating a normally open switch s11 located beneath the inclined tray 142, is placed in an aperture 196a formed in the tray surface close to the lower end thereof and projecting upwardly through the aperture. When a blank slides down the tray it depresses a lever 198 to actuate the switch s11.

The momentary closing of the switch s11 energizes, from the terminals a and c, a solenoid L7 of a holding relay by means of the leads w14, w16, w17, w18 and w9, thereby transferring the normally open contacts s13 and s16. The closing of contact s13 completes a holding circuit including the conductor w14, the solenoid L7, the conductor w16, the contact s13, a conductor w19, a normally closed switch s14 and the conductors w21, w22, w18 and w9 so that the relay solenoid L7 remains energized until the circuit is de-energized by the opening of the switch s14 as the carriage 158 returns to its advanced position, as will be described in detail below. The closing of contact s13 also energizes a timer T2 which is connected in parallel with the relay solenoid L7 by the leads w14 and w17. The timer T2 is similar in construction and operation to the timer T1 which has been described in detail heretofore; a switch s12 thereof closing a predetermined time after the energization of the timer T2 by the contact s13, as described above, energizing a solenoid L6, thereby to transfer a contact s15 from a normally closed to a normally open position.

The energization of solenoid L7 by the tray switch s11, as described heretofore, concomitantly closes the contact s16, thereby energizing the carriage retract solenoid L8 from the power source terminals a and c by means of a circuit including the conductor w14 linked to terminal a, the contact s16, the normally closed position of the timer contact s15, the leads w23 and w24, a normally closed switch s17, a lead w26 and the solenoid L8, the return electrical path to terminal c being ground. The solenoid L8 operates the control valve V6, the momentary energizing of the solenoid moving the valve into the position to admit air to the piston and cylinder assembly to retract the carriage 158, the valve remaining in such position until moved by the energization of a solenoid L10 whereupon the air is admitted to the cylinder to advance the carriage. The switch s17 is mounted on a block projecting upwardly from the table top 18 in such a manner that its actuating roller contacts the carriage side piece 158a in all positions except the fully extended one, thereby to open the above-described circuit to deenergize the solenoid L8 immediately upon the movement of the carriage 158 from its fully advanced position.

The continued movement of the carriage 158 from its advanced position causes a dog 195 to trip the switch s2 which is located on the table top 18 in the path of the dog, thereby to complete the heretofore-described circuit energizing the solenoid L1 so that the cylinder 66' automatically opens the charging door 62 in preparation for the next blank b. The dog 195 is pivotally suspended in a channel piece 196 which is fastened to the front of the cross member 186a whereby the retracting movement of the carriage 158 forces the dog 195 against the channel 196 as contact is made with the actuating member of switch S2, thus closing the switch; whereas the contact of the dog 19 with the actuating member by the advancing movement of the carriage causes the dog to pivot so that the switch is not closed.

The retraction of the carriage 158 also closes a normally open switch s18 which is mounted on the table top 18 with the roller of its actuating arm in the path of a block 197 fastened to the side piece 158b. The closing of switch s18 energizes the solenoid L9 from the power source terminals a and c through an electrical circuit comprising the lead w14, the relay contact s16, the normally closed position of the timer contact s15, the lead w23, the switch s18, the lead w27, the solenoid L9; the return path to the terminal c being through ground. As mentioned heretofore, the energization of the solenoid L9 opens the control valve V7 to admit air to the piston and cylinder assembly 132 through the duct 132a so that the male die closes upon the blank b which has been deposited in the female die by the tray 146 before the retraction of the carriage 158. The downward movement of the crosshead 124 releases the actuating arms of the switches s19 and s20 which are mounted upon the tie bar 124a, the switches s19 and s20 being opened and closed respectively thereby.

Upon the lapse of approximately 9 seconds from the energization of the timer T2 by the switch s11 and the relay contact s13, as described above, the time closing switch s12 closes to energize the timer solenoid L6 by means of a circuit comprising the terminal c, the leads w9, w18, w22, w21, the switch s14, the lead w19, the relay contact s13, the leads w16 and w17, the switch s12 and the solenoid L6 to the terminal a. The energization of the solenoid L6 transfers the timer contact s15 to its normally open position, thereby to energize the solenoid L11 which shifts the control valve V7 so that air from the duct 132a lifts the piston of the assembly 132 and the attached crosshead 124. The solenoid energizing circuit includes the terminal a, the conductor w14, the relay contact s16, the timer contact s15, a conductor w28, the normally closed switch s20 and the solenoid L11, the return path to terminal c being ground.

As the crosshead 124 reaches the top limit of its travel, it opens the switch s20 to interrupt the above-mentioned circuit and concomitantly closes the switch s19 energizing the solenoid L10, thus moving the valve V6 so that air from the duct 190a causes the piston of the assembly 190 to advance the carriage 158 and the tray 142. The circuit completed by the switch s19 includes the terminal a, the conductor w14, the relay contact s16, the timer contact s15, the conductor w28, the switch s19, the conductor w29, the solenoid L10 through ground to the terminal c.

The advancing of the carriage 158 causes a dog 195' mounted in a channel 196' in the rear of the cross member 186b to open the switch s14 which is mounted on the table 18 in the path thereof. The dog 195' is pivotally supported in the channel 196' so that the switch s14 is tripped only by the advancing movement of the carriage 158; movement of the carriage in the opposite direction causes the dog to ride over the switch without tripping it. The above opening of the switch s14 interrupts the circuit energizing the relay solenoid L7 so that the opening of the contact s16 resets the timer T2 in preparation for the next cycle.

A roller 221 mounted on a strip 158c, positioned longitudinally along one side of the carriage 158, is moved by the advancement of the carriage to trip mechanically a valve V10 to blow air into the ring 109 to dislodge the combs, as described heretofore.

As the carriage 158 reaches the end of its travel, the web 185 contacts the roller of the interlock s9 thereby closing the interlock so that the above-described circuit for energizing the valve V5 and operating the cylinder 58 to dump the oven can be energized for the next cycle. A box B is fastened to the table at one side to support most of the wiring for the various switches and housing members H and H' are placed at the rear of the machine to enclose the moving crosshead and dies both for safety and to enhance the appearance of the machine.

It should be understood that the present disclosure is for the purpose of illustration only and that this invention includes all modifications and equivalents which fall within the scope of the appended claims.

I claim:

1. Apparatus for converting a substantially flat annular blank into a plurality of combs, each having a concavo-convex contour, which comprises relatively movable male and female dies, means for delivering a plasticized annular blank between the dies, means to effect relative movement of the dies to convert said annular blank into a generally cylindrical crown-like member, and a plurality of cutters disposed about said female die and operative after effecting relative movement of said dies for severing said generally cylindrical member into a plurality of sections.

2. Apparatus for converting a substantially flat annular blank into a plurality of combs, each having a concavo-convex contour, comprising relative movable male and female dies, means including an inclined tray for gravitationally delivering a plasticized blank between the dies, means operable by sliding movement of the blank along the die to effect relative movement of said dies to convert said annular blank into a generally cylindrical crown-like member, and means operable after effecting relative movement of said dies for severing said generally cylindrical member into a plurality of sections.

3. Apparatus for converting a substantially flat annular blank into a plurality of combs, each having a concavo-convex contour, comprising relatively movable male and female dies, means including an inclined tray situated with its lower end between the dies for gravitationally delivering the plasticized blank to one of the dies, means operable by sliding movement of the blank as it approaches the lower end of the tray to effect retraction of the tray from between the dies and relative movement of said dies to convert said annular blank into a generally cylindrical crown-like member, and means operative after effecting relative movement of said guide for severing said member into a plurality of sections.

4. Apparatus for converting a substantially flat annular blank into a plurality of combs, each having a concavo-convex contour, comprising relatively movable male and female dies, means including an inclined tray situated with its lower end between the dies for gravitationally delivering the plasticized blank to the dies, heating elements associated with the tray to keep it at a temperature substantially above the temperature of the blank as delivered thereto, means operable by sliding movement of the blank as it approaches the lower end of the tray to effect retraction of the tray from between the dies and relative movement of said dies to convert said annular blank into a generally cylindrical crown-like member, and means operative after effecting relative movement of said guide for severing said member into a plurality of sections.

5. Apparatus for converting a substantially flat annular blank into a plurality of combs, each having a concavo-convex contour, which comprises relatively movable male and female dies, means including an inclined tray situated with its lower end above the level of the female die and movable from a position wherein the lower end is between the dies to a retracted position, means operative to retract the tray from its forward position between the dies, operation of said means being effected by sliding movement of the blank along the tray, means operative to effect relative movement of the dies so as to convert said annular blank into a generally cylindrical crown-like member, operation of said last-named means being initiated by retraction of said tray sufficiently to clear the dies, and means operable after effecting relative movement of said dies for severing said generally cylindrical member into a plurality of sections.

6. Apparatus for converting a substantially flat annular blank into a plurality of combs, each having a concavo-convex contour, which comprises relatively movable male and female dies, heating means for plasticizing the blanks, slide means for gravitationally delivering successive blanks while still plasticized to the dies, means to effect relative movement of said dies to convert said annular blank into a generally cylindrical crown-like member, and a plurality of cutters disposed about said female die and operable after effecting relative movement of said dies for severing said generally cylindrical member into a plurality of sections.

7. Apparatus for converting a substantially flat annular bank into a plurality of combs, each having a concavo-convex contour, which comprises relatively movable male and female dies, an oven for plasticizing the blanks, slide means for gravitationally delivering successive blank while still plastic to the female die, means operable to effect relative movement of the dies so as to convert said annular blank into a generally cylindrical, crown-like member, and a plurality of cutters disposed about said female die and operable after effecting relative movement of said dies for severing said generally cylindrical member into a plurality of sections.

8. Apparatus for converting an annular blank into a plurality of combs, each having a concavo-convex contour which comprises relatively movable male and female dies, an oven for plasticizing a blank placed therein, an inclined tray for receiving the plasticized blank from the oven and gravitationally delivering it onto the female die in a plastic condition, means operative to effect relative movement of the dies so as to convert said annular blank into a generally cylindrical crown-like member, means operable by sliding movement of the blank along the tray to initiate operation of said last-named means, and means operable following relative movement of the die to sever the generally cylindrical member into a plurality of sections.

9. Apparatus for converting a substantially flat annular blank into a plurality of combs, each having a concavo-convex contour, comprising plasticizing means in the form of an oven having top, bottom and side walls, a heating element arranged near the top of the oven, an article support arranged in the bottom of the oven to receive a blank to be plasticized, one wall of the oven having a discharge opening therein close to the bottom, a normally closed closure covering said discharge opening, means for raising the article support to tilt it toward the discharge opening and thereafter to allow it to return to its initial position by gravity, and means on the support operable by tilting movement thereof to swing the closure to an open position.

10. Apparatus for converting a substantially flat annular blank into a plurality of combs, each having a concavo-convex contour, comprising an oven having top, bottom and side walls, a heating element arranged near the top of the oven, an article support and article-centering means at the bottom of the oven, said centering means being shaped to engage the inner annulus of a blank dropped onto the support, one of the walls of the oven having a discharge opening therein close to the bottom, a normally closed closure covering said discharge opening, means for tilting the support to lift the blank off the centering means to permit it to slide toward the discharge opening, and means on the support operable upon tilting movement thereof to swing the closure to an open position.

11. Apparatus for converting a substantially flat annular blank into a plurality of combs, each having a concavo-convex contour, which comprises relatively movable male and female dies, an oven for plasticizing a blank placed therein, an inclined heated tray for sustaining the blank substantially at the oven temperature and gravitationally carrying it from the oven to the female die, said tray being situated with one end close to the oven and the other end between the dies, means operable to retract the tray from between the dies, means operable to move the dies relative to each other to convert the annular blank into a generally cylindrical crown-like member, means operable by movement of the blank along the tray to effect operation of the means for retracting the tray, means operable by retraction of the tray sufficiently to clear the dies to effect operation of the means for moving the dies relative to each other, and means operable after relative movement of the dies to sever said generally cylindrical member into a plurality of sections.

12. Apparatus for converting a substantially flat annular blank into a plurality of combs, each having a concavo-convex contour, comprising means for plasticizing a blank, relatively movable dies, means for effecting movement of the dies into and out of molding engagement for molding a blank placed between them, and transfer means interposed between the two comprising an inclined tray having a lower end situated between the dies and an upper end close to the plasticizing means for receiving from the latter a plasticized blank and gravitationally transferring it to the dies, a carriage supporting the tray for movement relative to the dies, means for effecting movement of the carriage in a direction to retract the tray from between the dies following deposition of a blank between the dies, operation of said last-named means being effected by sliding movement of the blank along the tray, and other means operable by separation of the dies to move the carriage in a direction to restore the tray to its initial position.

13. Apparatus for converting a substantially flat annular blank into a plurality of combs, each having a concavo-convex contour, comprising means for plasticizing a blank, relatively movable dies, means for effecting movement of the dies into and out of molding engagement for molding a blank placed between them, and transfer means interposed between the two comprising an inclined tray having a lower end situated between the dies and an upper end close to the plasticizing means for receiving from the latter a plasticized blank and gravitationally transferring it to the dies, a track located between the plasticizing means and the dies, a carriage to which the tray is fastened mounted on the track for movement therealong, means for effecting movement of the carriage in a direction to retract the tray from between the dies following deposition of a blank between the dies, operation of said last-named means being effected by sliding movement of the blank along the tray, and other means operable by separation of the dies to move the carriage in a direction to restore the tray to its initial position.

14. Apparatus for converting a substantially flat annular blank into a plurality of combs, each having a concavo-convex contour, which comprises relative movable male and female dies, an oven for receiving a blank for plasticization, said oven having a normally closed discharge opening therein, a discharge plate in the oven supporting the blank during heating, means for tilting the plate and simultaneously swinging the closure to uncover the discharge opening to spill the blank through the opening, an inclined tray for receiving the plasticized blank from the oven and gravitationally delivering it to the female die, means for effecting relative movement of said dies to convert said annular blank into a generally cylindrical crown-like member, and means operative after effecting relative movement of said dies for severing said generally cylindrical member into a plurality of sections.

15. Apparatus for converting a substantially flat annular blank into a plurality of combs, each having a concavo-convex contour, which comprises relatively movable male and female dies, an oven for receiving a blank to be plasticized, said oven having a charging opening and normally closed closure therefor, a discharge opening and normally closed closure therefor, a discharge plate in the oven for supporting the blank during plasticization, a tray situated between the discharge opening and the dies for gravitationally conveying a blank delivered onto the tray to the dies, retracting means for retracting the tray from between the dies, means along the tray operable by passage of a blank therealong to effect operation of said retracting means, means operable to effect relative movement of the dies to convert the blank into a generally cylindrical crown-like member, operation of said last-named means being effected by retraction of the tray, other means actuated by retraction of the tray to effect dwell and then separation of the dies, means for restoring the tray to its initial operative position, said means being operable by separation of the dies, said last-named means being set into operation by restoration of the tray to its initial position, and a manual trip for closing the charging door and setting a time switch for lifting the plate to discharge the plastic blank at the end of a predetermined time.

16. Apparatus for converting a substantially flat annular blank into a plurality of combs, each having a concavo-convex contour, which comprises relatively movable male and female dies, said female die having a die cavity into which telescopically fits the male die with a clearance substantially equal to the thickness of the comb, said female die having a plurality of substantially equally spaced orifices near the bottom thereof in communication with the clearance space between the dies, means for effecting relative closing movement of the dies to convert said annular blank into a generally cylindrical crown-like member having a circular back from which project teeth, heating means for plasticizing the blanks, means operable following closure of the dies to inject air through the orifices into the clearance space in the vicinity of the back of the crown to set the plastic, and a plurality of cutters disposed about said female die and operable substantially simultaneously to sever said circular back at a plurality of places.

17. Apparatus for converting a substantially flat annular blank into a plurality of combs, each having a concavo-convex contour, which comprises male and female dies relatively movable into and out of closed position, said female die having an annular wall defining a die cavity into which telescopically fits the male die with a clearance substantially equal to the thickness of the blank, said female die having an opening through its cylindrical wall within which there is situated a normally retracted pin, means for effecting relatively closing movement of the dies to convert said annular blank into a generally cylindrical crown-like member having an annular back and projecting teeth, means operable after the relative closing movement of the dies for severing said crown into a plurality of sections, and means operable after the separation of the dies to force said normally retracted pin inwardly into the die cavity to separate one section of the severed crown from the rest whereupon said severed sections will collapse inwardly into the die cavity.

18. Apparatus for converting a substantially flat annular blank into a plurality of combs, each having a concavo-convex contour, which comprises male and female dies relatively movable into and out of closed position, said female die having an annular wall defining a die cavity into which telescopically fits the male die with a clearance space substantially equal to the thickness of the blank therebetween, said female die having a central opening in its bottom of substantially smaller diameter than the male die and at least one opening through its wall within which there is situated a normally retracted pin, means for effecting relative closing movement of the dies to convert said annular blank into a generally cylindrical crown-like member having a circular back and projecting teeth, means operable after the relative closing movement of the dies for severing said cylindrical member into a plurality of sections, and means operable after the separation of the dies to force said retracted pin inwardly into the die cavity and separate a section of the severed crown from the rest whereupon the sections will collapse and fall by gravity through the central opening in the bottom of the die cavity.

19. Apparatus for converting a substantially flat annular blank into a plurality of combs, each having a concavo-convex contour, comprising male and female dies relatively movable into and out of closing position, said female die having an annular wall defining a die cavity into which telescopically fits the male die with a clearance substantially equal to the thickness of the blank therebetween, said female die having a central opening in one end of substantially smaller diameter than the male die and a plurality of orifices in its wall near its other end, means for effecting relative closing movement of the dies to convert said annular blank into a generally cylindrical crown-like member having a circular back and projecting teeth, means operable after the relative closing movement of the dies for severing said cylindrical member into a plurality of sections, and means for blowing air through said orifices adjacent to the teeth to force the same inwardly thereby to cause the sections to collapse and to effect gravitational discharge of the separated sections through the central opening in the die.

20. Apparatus for converting a substantially flat annular blank into a plurality of combs, each having a concavo-convex contour, comprising male and female dies relatively movable into and out of closing position, said female die having an annular wall defining a die cavity into which telescopically fits the male die with a clearance substantially equal to the thickness of the blank therebetween, said female die having a central opening in one end of substantially smaller diameter than the male die, a plurality of orifices in its wall near its other end and at least one opening in its wall between its mouth and bottom within which there is situated a normally retracted pin, means for effecting relative closing movement of the dies to convert said annular blank into a generally cylindrical crown-like member having a circular back and projecting teeth, means operable after the relative closing movement of the dies for severing said cylindrical member into a plurality of sections, means operable after the dies separate to force the pin into the die cavity to separate a section of the severed member, and means for thereafter injecting blasts of air through the orifices to blow the separated sections inwardly toward the center of the dies so that they will fall by gravity through the central opening therein.

21. Apparatus for converting a substantially flat annular blank into a plurality of combs, each having a concavo-convex contour, comprising male and female dies relatively movable into and out of closing position, said female die having an annular wall defining a die cavity into the opening mouth of which telescopically fits the male die with a clearance substantially equal to the thickness of the blank therebetween, said female die having a central opening in one end of substantially smaller diameter than the male die, a plurality of orifices near the bottom arranged to open into the clearance space, a plurality of orifices near its other end arranged to open inwardly into the die cavity and at least one opening in the wall between the two sets of orifices within which there is situated a normally retracted pin, means for effecting relatively closing movement of the dies to convert said annular blank into a general cylindrical crown-like member having a circular back and projecting teeth, means operable after relative closing movement of the dies for simultaneously severing the member into a plurality of pieces, injecting air through the bottom orifices in the vicinity of the circular back, and means operable after opening movement of the dies for simultaneously forcing said pin inwardly and injecting blasts of air through the top orifices.

22. Apparatus for converting a substantially flat annular blank into a plurality of combs, each having a concavo-convex contour, comprising male and female dies relatively movable into and out of closing position, said female die having an annular wall defining a die cavity into the open mouth of which telescopically fits the male die with a clearance substantially equal to the thickness of the blank therebetween, means for effecting relative movement of the dies to convert said annular blank into a cylindrical crown-like member having a circular back and projecting teeth, a plurality of cutters pivotally mounted to project into the die cavity near the bottom thereof in the vicinity of the clearance to sever the circular back after relative movement of the dies, and gauge means associated with the female die for orienting the blank with respect to the cutters so that they will cut between teeth.

23. Apparatus for converting a substantially flat annular blank into a plurality of combs, each having a concavo-convex contour, comprising male and female dies, said female die having a cavity therein of substantially the same diameter as the blank, a concentrically arranged annular support within the die cavity of slightly larger diameter than the inner central annulus of the blank upon which the blank rests with its central annulus within the support and the roots of its teeth in contact with the support, said male die having a part arranged telescopically to fit into the annular support with a clearance equal to the thickness of the blank and to convert said annular blank into a generally cylindrical crown-like member by forcing it into the clearance space between the annular suport and said male part and a surrounding ring having an opening of larger diameter than the annular support movable toward the annular support to engage and deflect the teeth inwardly against the peripheral surface of the first male part.

24. Apparatus for converting a substantially flat annular blank into a plurality of combs, each having a concavo-convex contour, comprising male and female dies, said female die having a cavity therein substantially of the same diameter as the blank, a centrally arranged annular work support within the die cavity of slightly larger diameter than the inner annulus of the blank upon which the blank rests with its inner annulus within the support and the roots of its teeth in engagement with the upper edge of the support, said male die having a plunger arranged telescopically to fit into the annular support with a clearance equal to the thickness of the blank, cutting means arranged about the female die cavity with cutting edges projecting into the space within the annular support, gauge means arranged around the die cavity for automatically positioning the blank with respect to the cutters, means for effecting relative movement of the dies to convert the blank into a generally cylindrical crown-like member, and means thereafter projecting the cutters into the annular support to sever the circular back between the teeth.

25. Apparatus for converting a substantially flat annular blank into a plurality of combs, each having a concavo-convex contour, comprising male and female dies, said female die having a die cavity into which telescopically fits the male die with a clearance substantially equal to the thickness of the blank, cutters pivotally mounted around the female die to be projected into the die cavity close to the bottom thereof, yieldable means supporting the female dies, means for effecting relative movement of the dies to engage the male die within the female die and thereafter to move the engaged dies in translation in opposition to the yieldable means supporting the female die, and means operable during the translational movement of the dies to actuate the cutters.

26. Apparatus for converting a substantially flat annular blank into a plurality of combs, each having a concavo-convex contour, comprising a pair of coacting dies, one of said dies having an annular support within which there is an annular subjacent ledge, the other including a plunger having a vertically convex peripheral surface of such diameter as telescopically to fit into the annular support with a clearance space therebetween substantially equal to the thickness of the blank for converting the flat bank into a cylinder by forcing the back into engagement with the ledge and turning the teeth upwardly to take up the clearance space and a tandemly arranged conforming ring movable to telescope over the outside of the annular support and having an inwardly sloping peripheral wall for engaging the upwardly projecting teeth and deflecting them inwardly, means yieldably holding the plunger in advance of the ring, and means for effecting relative movement of the dies to seat the plunger within the annular support against the ledge prior to movement of the ring into telescoping engagement with the support.

27. Apparatus for converting a substantially flat annular blank into a plurality of combs, each having a concavo-convex contour, comprising a pair of coacting dies, one of said dies having an annular support within which there is an annular subjacent ledge, a vertically movable crosshead supporting the other die for movement to and from the first die, said other die including a plunger, means yieldably supporting the plunger on the crosshead, said plunger having a vertically convex peripheral surface the maximum diameter of which is such that it will fit into the annular support with a clearance substantially equal to the thickness of the blank, and a conforming ring fixed to the crosshead behind the plunger of a size telescopically to fit over the outside of the annular support and having an inwardly sloping inner wall, the spacing of said plunger ahead of the ring being such that upon movement of the crosshead to bring the dies into engagement the plunger will seat against the ledge prior to movement of the ring into engagement with the outside of the annular support.

28. Apparatus for converting a substantially flat annular blank into a plurality of combs, each having a concavo-convex contour, comprising a pair of coacting dies, means yieldably supporting one die for limited bodily movement, said die having an annular support within which there is an annular ledge, and cutters spaced about the support with their cutting edges projectable into the annular support just above the annular ledge, the other die including a plunger and conforming ring bodily movable to and from the first die, said plunger having a vertically convex peripheral surface of such dimension as to fit into the annular support with a clearance space equal to the thickness of the blank, said conforming ring having an inwardly sloping inner wall of such diameter as to telescope over the outside of the annular support, and said plunger and ring being tandemly spaced so that upon bodily movement of the plunger and ring toward the support the plunger will seat against the ledge prior to movement of the ring into engagement with the support, means for effecting bodily movement of the plunger and ring to bring them successively into engagement with the work support and for thereafter moving them while seated against the work support to displace the work support bodily, displacement of said work support being operable to effect projection of the cutters inwardly into the support and downwardly substantially into engagement with the ledge.

LESTER T. SAWYER.

REFERENCES CITED

The following references are of record in the file of this patent:

UNITED STATES PATENTS

| Number | Name | Date |
| --- | --- | --- |
| 1,578,337 | Marx et al. | Mar. 30, 1926 |
| 1,738,097 | Cooper | Dec. 3, 1929 |
| 1,972,789 | Newkirk | Sept. 4, 1934 |
| 2,230,189 | Ferngren | Jan. 28, 1941 |
| 2,304,141 | Bergmann | Dec. 8, 1942 |
| 2,450,448 | Sawyer | Oct. 5, 1948 |